(12) United States Patent
Fanini et al.

(10) Patent No.: US 9,739,904 B2
(45) Date of Patent: Aug. 22, 2017

(54) THREE-PHASE FLOW IDENTIFICATION AND RATE DETECTION

(71) Applicants: Otto N. Fanini, Houston, TX (US); Mohamed Daoud, Spring, TX (US)

(72) Inventors: Otto N. Fanini, Houston, TX (US); Mohamed Daoud, Spring, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 414 days.

(21) Appl. No.: 14/519,817

(22) Filed: Oct. 21, 2014

(65) Prior Publication Data

US 2016/0108730 A1 Apr. 21, 2016

(51) Int. Cl.
*G01V 1/52* (2006.01)
*G01S 15/02* (2006.01)
(Continued)

(52) U.S. Cl.
CPC .............. *G01V 1/52* (2013.01); *E21B 47/10* (2013.01); *G01S 7/539* (2013.01); *G01S 15/02* (2013.01); *G01S 15/50* (2013.01); *G01S 15/58* (2013.01); *G01S 15/87* (2013.01); *G01S 15/88* (2013.01); *G01V 1/44* (2013.01); *G01V 2001/526* (2013.01)

(58) Field of Classification Search
CPC ........... E21B 47/101; G01V 1/44; G01V 1/52
See application file for complete search history.

(56) References Cited

U.S. PATENT DOCUMENTS

| 5,936,913 A | 8/1999 | Gill et al. | |
|---|---|---|---|
| 6,260,408 B1 * | 7/2001 | Vig | G01N 11/16 73/54.24 |

(Continued)

FOREIGN PATENT DOCUMENTS

WO 2013122786 A1 8/2013

OTHER PUBLICATIONS

Notification of Transmittal of the International Search Report and the Written Opinion of the International Searching Authority, or the Declaration; PCT/US2015/056671; Mailing date Jan. 27, 2016, 9 pages.

(Continued)

*Primary Examiner* — Paul West
(74) *Attorney, Agent, or Firm* — Cantor Colburn LLP

(57) ABSTRACT

An apparatus for estimating a fraction of each component of a fluid of interest flowing in a cased borehole and a property of the fluid includes an acoustic waveguide sensor having a waveguide configured to guide an acoustic signal along a waveguide path and an array of acoustic transducers coupled to the waveguide for transmitting and receiving an acoustic signal, the acoustic waveguide sensor being configured to transmit and receive a compression-wave acoustic signal that is reflected off of the casing and transmit and receive a shear-wave acoustic signal that propagates along the path. A controller is coupled to the waveguide sensor and configured to perform a compression-wave acoustic measurement on the fluid using the acoustic waveguide sensor in order to estimate the fraction of each component of the fluid and to perform a shear-wave acoustic measurement in order to estimate the property of the fluid.

25 Claims, 10 Drawing Sheets

(51) Int. Cl.
*G01S 15/88* (2006.01)
*G01V 1/44* (2006.01)
*G01S 7/539* (2006.01)
*G01S 15/50* (2006.01)
*G01S 15/58* (2006.01)
*G01S 15/87* (2006.01)
*E21B 47/10* (2012.01)

(56) References Cited

U.S. PATENT DOCUMENTS

| | | |
|---|---|---|
| 8,387,743 B2 | 3/2013 | Oraby |
| 2001/0035312 A1* | 11/2001 | Han .................... E21B 47/101 181/115 |
| 2004/0128072 A1 | 7/2004 | Mandal |
| 2012/0179377 A1* | 7/2012 | Lie ..................... E21B 47/101 702/6 |

OTHER PUBLICATIONS

Bellabarba, et al.; "Ensuring Zonal Isolation Beyond the Life of the Well"; Oil Review (2008); 14 pages.

Lindner, G., et al., "Wave Propagation in an Acoustic Wave Guide Sensor for Liquids Driven by Pulsed Excitation of Surface Acoustic Waves", IEEE, 2008, pp. 39-43.

* cited by examiner

THREE-PHASE FLOW IDENTIFICATION AND RATE DETECTION

BACKGROUND

Hydrocarbons such as oil and gas are produced from reservoirs contained in earth formations. Boreholes drilled into the reservoirs are used to gain access to the hydrocarbons. Once a borehole is drilled, it is usually lined with a casing that is cemented in place. The hydrocarbons are then extracted from a reservoir and then flowed to the surface through the cased borehole. Fluid flowing through the borehole can include oil, gas, and water in various proportions. Various types of tools and instruments may be disposed in the boreholes in order to identify the different components of extracted fluid and their proportions in addition to their flow rates. Advancements in technology to improve these types of tools and instruments would be well received in the drilling industry.

BRIEF SUMMARY

Disclosed is an apparatus for estimating a fraction of each component of a fluid of interest flowing in a cased borehole and a property of the fluid. The apparatus includes: a carrier configured to be conveyed through the cased borehole; an acoustic waveguide sensor disposed on the carrier, the acoustic waveguide sensor having a waveguide configured to guide an acoustic signal along a path of the waveguide and an array of acoustic transducers coupled to the waveguide and configured to transmit an acoustic signal and receive a return acoustic signal, the acoustic waveguide sensor being configured to (i) transmit and receive a compression-wave acoustic signal that is reflected off of the casing and (ii) transmit and receive a shear-wave acoustic signal that propagates along the path of the waveguide; and a controller coupled to the acoustic waveguide sensor and configured to perform a compression-wave acoustic measurement on the fluid using the acoustic waveguide sensor in order to estimate the fraction of each component of the fluid and to perform a shear-wave acoustic measurement in order to estimate the property of the fluid.

Also disclosed is a method for estimating a fraction of each component of a fluid flowing in a cased borehole. The method includes: conveying a carrier through the cased borehole, a waveguide sensor being disposed on the carrier, the waveguide sensor comprising a waveguide configured to guide an acoustic signal along a path of the waveguide and an array of acoustic transducers coupled to the waveguide and configured to transmit an acoustic signal and receive a return acoustic signal, the acoustic waveguide sensor being configured to (i) transmit and receive a compression-wave acoustic signal that is reflected off of the casing and (ii) transmit and receive a shear-wave acoustic signal that propagates along the path of the waveguide; performing a compression-wave acoustic measurement on the fluid using the acoustic waveguide sensor; performing a shear-wave acoustic measurement on the fluid using the acoustic waveguide sensor; estimating the fraction of each component of the fluid using the compression-wave acoustic measurement; and estimating the property of the fluid using the shear-wave acoustic measurement; wherein the estimating the fraction and the estimating the property is performed by a controller coupled to the acoustic waveguide sensor and configured to perform the compression-wave and shear-wave acoustic measurements on the fluid using the acoustic waveguide sensor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are apparatus and method estimating a percentage of each component of a fluid of interest flowing in a cased borehole using acoustic energy or sound waves. In general, fluid components may include oil, water and/or gas. The acoustic energy is transmitted and received by an array of acoustic transducers, which can transmit and/or receive the acoustic energy or signals. An acoustic signal is transmitted toward the casing where it is reflected back to the array. Time-of-flight (TOF) measurements are performed as the fluid of interest flows by the array. The TOF measurements are compared to reference TOF measurements for each expected fluid component in order to identify the components present in the fluid of interest. Further, a pattern of TOF measurements is established by measurements using upstream transducers. When the same or similar pattern is recognized by measurements using downstream transducers, the flow rate can be calculated by recording the time it took for the pattern to move from the upstream transducers to the downstream transducers and knowing the distance between the upstream transducers and the downstream transducers. Other properties may also be determined from interaction of shear acoustic waves guided by a waveguide sensor with the fluid of interest.

Figure 1:
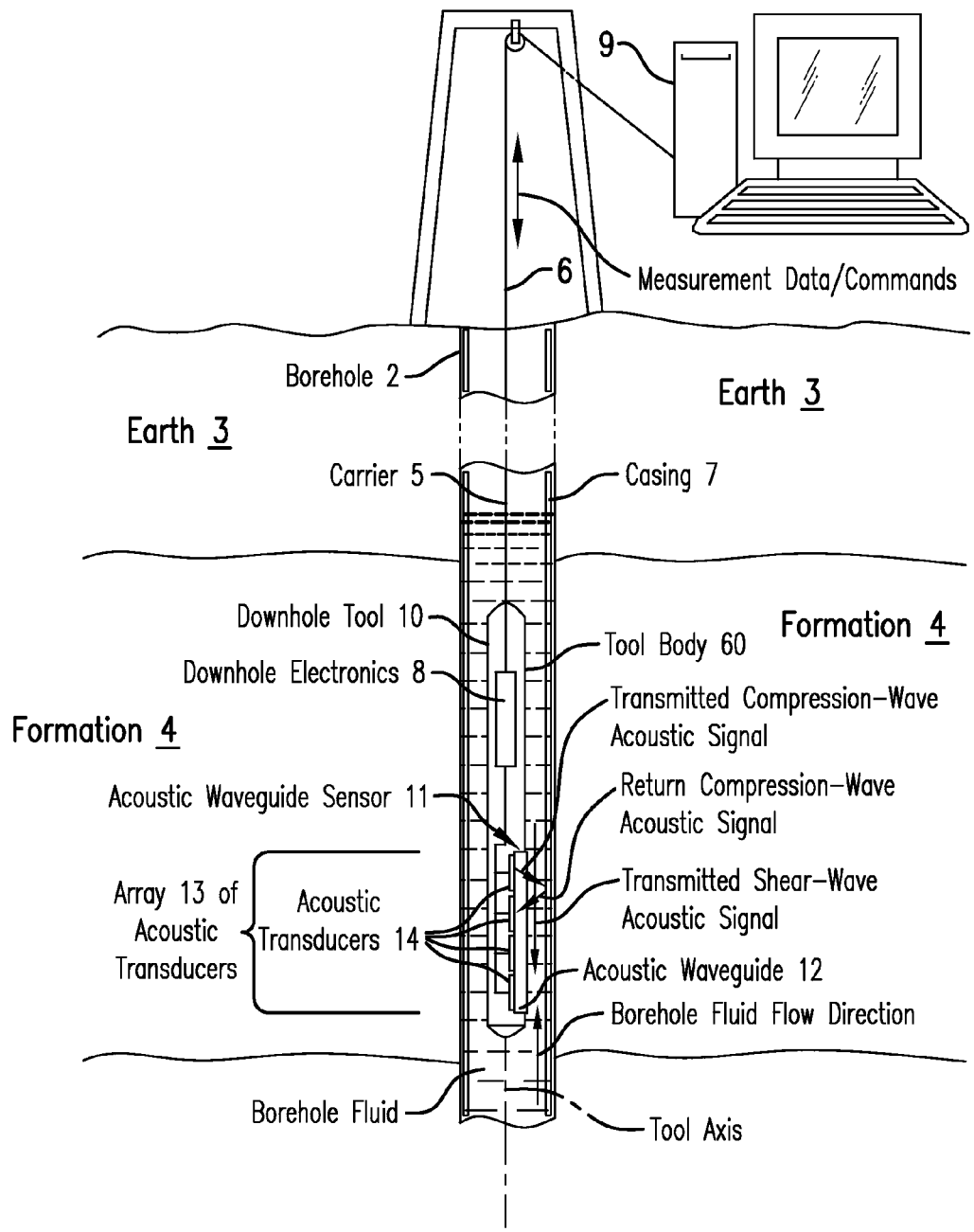
FIG. 1 illustrates a cross-sectional view of an exemplary embodiment of an acoustic downhole tool disposed in a borehole penetrating the earth.

Apparatus for implementing the disclosed method is now discussed with reference to FIG. 1. In FIG. 1, a side view is illustrated of an exemplary embodiment of a downhole acoustic tool 10 disposed in a borehole 2 penetrating the earth 3, which includes a formation 4. The borehole 2 or portions of the borehole 2 may be lined with a casing 7, which may have perforations for having an extracted borehole fluid enter the borehole 2. The acoustic tool 10 is conveyed through the borehole 2 by a carrier 5. In the embodiment of FIG. 1, the carrier 5 is an armored wireline 6. Besides supporting and conveying the acoustic tool 10 in the borehole 2, the wireline 6 can provide communications (i.e., telemetry) between the downhole tool 10 and a computer processing system 9 disposed at the surface of the earth 3. Communications can include sending measurements uphole to the computer processing system 9 or commands downhole to the downhole tool 10. In addition, the wireline 6 can supply electrical power to the acoustic tool 10. In order to operate the acoustic tool 10, process measurement data, and/or provide a communications interface with the surface computer processing system 9, the downhole tool 10 includes downhole electronics 8. The operating, control, processing, and display functions of the disclosure may be performed by the downhole electronics 8, the computer processing system 9, or a combination thereof. Hence, the downhole electronics 8 and/or the computer processing system 9 may be referred to as a controller. In an alternative embodiment referred to as logging-while-drilling (LWD) or measurement-while-drilling (MWD), the carrier 5 can be a drill string or drill tubular. Telemetry for LWD or MWD may include pulsed-mud or wired drill pipe. In wireline, LWD, or MWD embodiments, measurement data may be downloaded in real time or after the downhole NMR tool 10 is retrieved from the borehole 2.

The acoustic tool 10, having tool body 60, includes one or more acoustic waveguide sensors 11. Each waveguide sensor 11 includes a waveguide 12 and an array 13 of acoustic transducers 14 acoustically coupled to the waveguide 12. Each of the acoustic transducers 14 is configured to (i) convert an electrical signal into a corresponding acoustic signal (i.e., sound wave) that is transmitted toward a wall of the borehole 2 and/or along a path of the waveguide 12 and/or (ii) receive an acoustic return signal from the borehole wall due to the transmitted acoustic signal being reflected or an acoustic signal propagating along he waveguide and convert the received return acoustic signal into a corresponding electrical signal. It can be appreciated that some acoustic transducer may be configured to transmit an acoustic signal, some acoustic transducers may be configured to receive an acoustic signal, and some or all of the acoustic transducers may be configured to both transmit and receive acoustic signals, that is, to function as transceiver transducers. Any or all of the acoustic transducers may be driven by piezoelectric operation, electromagnetic operation, or magnetostrictive operation as non-limiting embodiments. In one or more embodiments, acoustic wave measurements are performed at one or more frequencies in the range of 10 kHz to 1 GHz, although some measurements may be performed at other frequencies. In the embodiment of FIG. 1, the top transducer is configured to transmit a compression-wave acoustic signal that is reflected off the borehole wall or casing with the reflected acoustic signal being received by one or more other transducers. The top transducer may also be a transceiver transducer that transits the compression-wave acoustic signal and then receives the reflected compression-wave acoustic signal. The top transducer may also transmit a shear-wave acoustic signal that travels along a path of the waveguide and is received by one or more of the other transducers. Other combinations of transducers may also be used.

Still referring to FIG. 1, the downhole electronics 8 are coupled to the acoustic waveguide sensor 11 and configured to operate the waveguide sensor 11 and/or process waveguide sensor measurement data obtained downhole. Downhole waveguide sensor operation, control and data processing operations may be performed by the downhole electronics 8, the computer processing system 9, or a combination thereof. Hence, the downhole electronics 8 and/or the computer processing system may be referred to as a controller. The waveguide sensor 11 may be operated continuously as the acoustic tool 10 is conveyed through the borehole 2 or at discrete selected depths in the borehole 2.

The waveguide sensor 11 is operated to perform acoustic measurements that are then used to estimate a fraction of each component of the fluid of interest flowing past the waveguide sensor to the surface of the earth. The acoustic transducers in the array are may be disposed along an axis having a vector component parallel to the longitudinal axis of the acoustic tool 10. With this transducer configuration, acoustic measurement can be performed on a volume of borehole fluid as this volume flows from upstream to downstream by the waveguide sensor 11 The acoustic measurements may include time-of-flight (TOF) measurements in which the time it takes for a transmitted compression-wave acoustic signal to traverse the annulus, reflect off of the borehole wall and return to the array to be received and measured. Oil, water and gas have different densities and thus have different acoustic velocities. As each of these components flows past the acoustic waveguide sensor, different TOF values will be measured due to the different acoustic velocities of the fluid components. By having a processor compare the measured TOF values to known reference TOF values for a specific fluid component (calibrated to the present acoustic tool), borehole fluid components can be identified as the different fluid components flow by the waveguide sensor. The fraction of each component in the borehole fluid can be determined by recording the amount of times each fluid component was identified over a specified time interval. The fraction of a specific component may then be estimated as the number of times that component was identified divided by the sum of the number of times each component was identified assuming that the acoustic measurements were performed at a constant rate and the borehole fluid flow rate was substantially constant. For example, with N representing a number of times a fluid component was identified, the fraction of oil in a borehole fluid may be estimated as: $N_{OIL} = N_{OIL}/(N_{OIL} + N_{WATER} + N_{GAS})$.

In addition to identifying fluid components and estimating their fraction in a borehole fluid, the waveguide sensor 11 may also be used to estimate the flow rate of each component. The flow rate of each component may be estimated by noting a pattern of identifying each component over time using one or more acoustic transducers that are disposed towards the lower end of the acoustic tool and then measuring the time until this same pattern is noted by acoustic measurements using one or more acoustic transducers that are disposed towards the upper end (i.e., downstream end) of the acoustic tool. The flow rate is thus the known distance between the tool upper-end transducer or transducers and the tool lower-end transducer or transducers divided by the measured time it took for the identification pattern to traverse that distance. In one example, the borehole fluid may contain a series of gas bubbles that flow to the surface with the borehole fluid. This series of gas bubbles will be identified using a lower-end or upstream acoustic transducer and has an associated identification pattern (identification as a function of time). This same series of gas bubbles having the same or nearly the same associated pattern will then be identified using an upper-end or downstream acoustic transducer. The flow rate for this series of gas bubbles may then be estimated as the distance between the upstream acoustic transducer and the downstream acoustic transducer divided by the measured time it took for the identification pattern for this series of gas bubbles to be recognized after the pattern was previously recognized upstream. Similar techniques involving pattern tracking may be used to estimate the flow rate of each component of the fluid of interest if the components have different flow rates.

In other embodiments, estimation of material flow rate along the borehole may be based on correlation of features (e.g., with more than one phase flow interface reference detected). A time to space mapping may be employed using temporal array data (fluid properties detected in each array receiver) received from multiple acoustic receivers in the waveguide. The temporal array data can be converted into spatial information with Fourier-transform holography generating a spatial hologram of the media flow (e.g., three phase flow) at each time of interest. Then, through time delayed cross-correlation of various spatial holograms a flow rate can be estimated for each phase and also if the three phase flow is moving uniformly or a phase is advancing faster than the other phases preserving the spatial flow arrangement and its corresponding spatial hologram and spatial spectrum as the material flow moves along the casing or tubing.

In other embodiments, TOF may be detected through correlation of time lapsed measurements using the acoustic array. The physical spacing of the receivers and the time lapse of positive correlation of two-dimensional matrix flow data patterns (receiver data array using receivers 1 through n versus time observation of array data) may be used to determine TOF. A holographic system analysis may be employed with this method using linear cross-correlation.

Figure 2A:
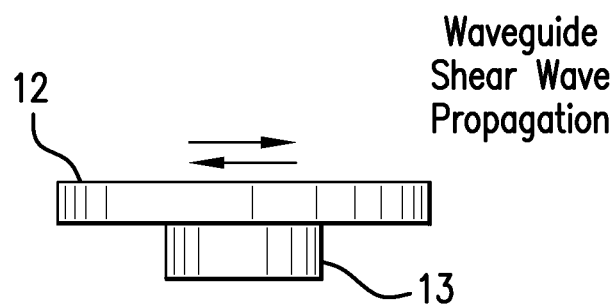
FIGS. 2A and 2B, collectively referred to as FIG. 2, depict aspects of compression acoustic waves and shear acoustic waves.
Figure 2B:
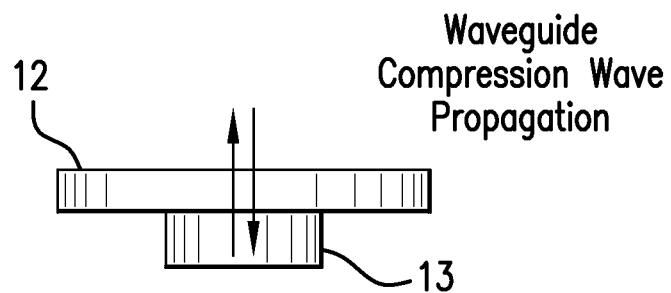

FIG. 2 depicts aspects of shear-wave acoustic signals (FIG. 2A) and compression-wave acoustic signals (FIG. 2B). Compression-wave acoustic signals may be used for fluid component identification, fraction estimation, and flow rate purposes, while shear-wave acoustic signals may be used for acoustic velocity and/or acoustic impedance estimation. Compression-wave acoustic signals may be differentiated from shear-wave acoustic signals using time measuring circuits that measure the time from when an acoustic signal is transmitted to when the corresponding return signal is received. Based on the geometry of the tool disposed in the borehole, the approximate time parameters of these signals can be calculated to determine an approximate receiving time or time window after transmission for compression-waves and shear waves. The type of waves received can then be determined by the time at which they were received or the time window in which they were received relative to the time of transmission. Other techniques may also be used to distinguish between compression wave acoustic signals and shear wave acoustic signals such as correlation and/or semblance processing techniques. Compression-wave acoustic signals are generally used to identify fluid components, estimate a fraction for each component, and estimate a flow rate for each component. Shear-wave acoustic signals are guided along a path of the acoustic waveguide 12 and shear-wave acoustic measurements may relate to time-of-flight measurements between two or more acoustic transducers to measure acoustic velocity of the fluid of interest and/or a decrease or change in amplitude of the shear-wave acoustic signal as it travels between two or more acoustic transducers to measure acoustic impedance.

Figure 3A:
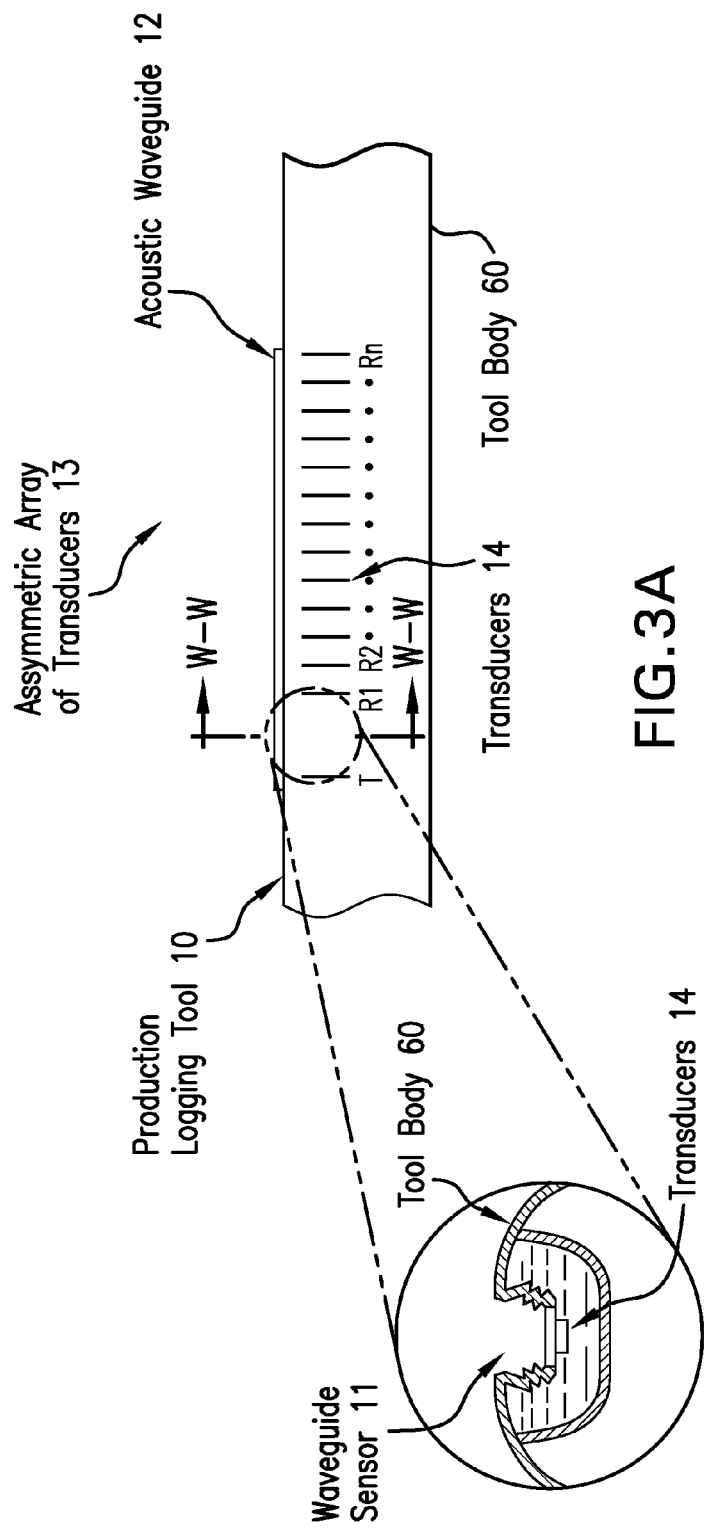
FIGS. 3A and 3B, collectively referred to as FIG. 3, depict aspects of an array of the acoustic transducers being coupled to an acoustic waveguide.
Figure 3B:
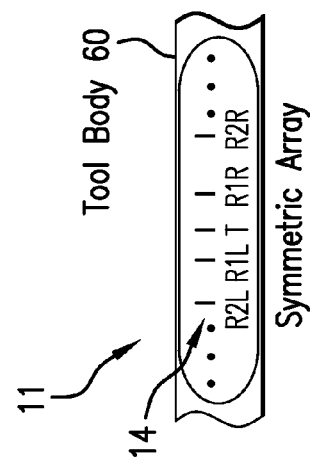

FIG. 3 depicts aspects of the array 13 of the acoustic transducers 14 being coupled to the acoustic waveguide 12. In one or more embodiments, one acoustic transducer 14 is designated as a transmitter transducer configured to transmit an acoustic signal while the remainder of the transducers in the array is designated to receive the transmitted acoustic signal. In the embodiment of FIG. 3A, the array 13 is asymmetric with the receiver transducers being disposed to one side of the transmitter transducer. In the embodiment of FIG. 3B, the array 13 is symmetric with an equal number of the receiver transducers being disposed on either side of the transmitter transducer. Asymmetric acoustic transducer arrays may be used to maximize the number of receiver transducers to one side of a transmitter transducer for pattern tracking purposes, while symmetric arrays may be used to increase the precision of measurements by averaging signals received by symmetrical receiver transducers on both sides of a transmitter transducer to account for structural anomalies.

Figure 4A:
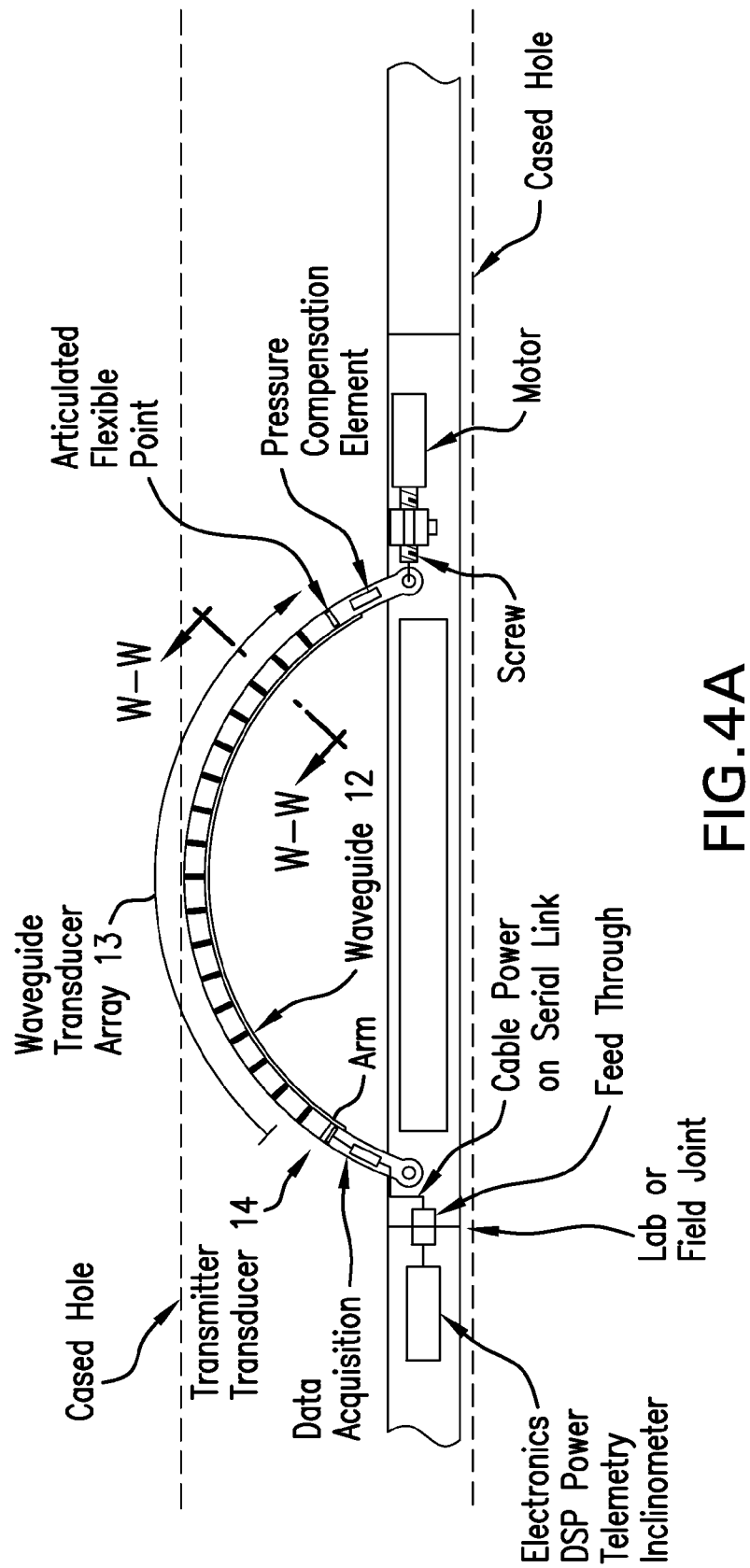
FIGS. 4A and 4B, collectively referred to as FIG. 4, depict aspects of an array of waveguides flexibly extending from the acoustic downhole tool into the borehole annulus.
Figure 4B:
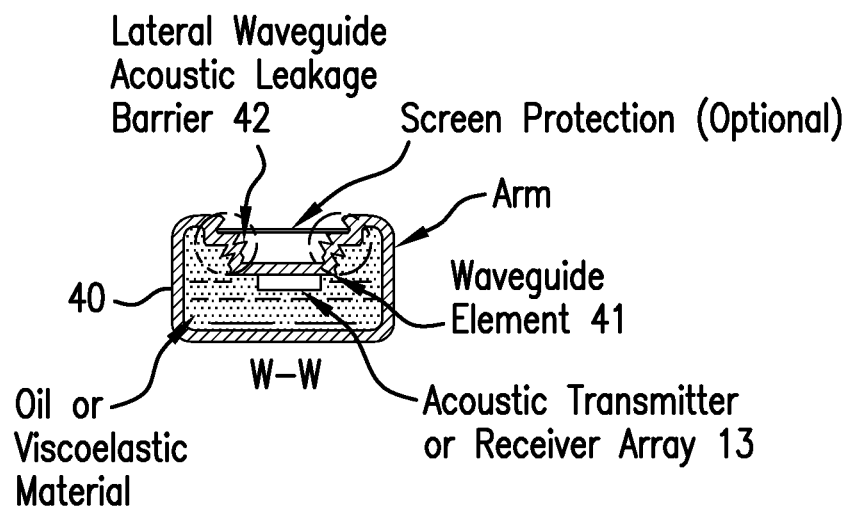

FIG. 4 depicts aspects of one embodiment of the acoustic tool 10. In the embodiment of FIG. 4A, the acoustic tool 10 includes a flexible waveguide or a series of acoustic waveguides 12 where each waveguide 12 is flexibly coupled to an adjacent waveguide 12. A longitudinal force applied to an end waveguide 12 will force the flexible waveguide or series of waveguides 12 to form an arc and extend into the borehole annulus. The longitudinal force may be applied by a motor-screw combination that can apply a force having a vector component parallel to the longitudinal axis of the tool 10. An advantage of this embodiment is that the waveguide sensor 11 will be exposed to a greater cross-section of the borehole and thus to a greater cross-section of the borehole fluid components flowing to the surface in the borehole 2 to help ensure that the acoustic measurements are representative of the borehole fluid components. In this embodiment, a local module may include a digital signal processor (DSP), electrical power supply, telemetry, and an inclinometer. The inclinometer may be used to measure the inclination of the borehole with respect to a vertical axis and thus determine the inclination of the flow of the borehole fluid. A laboratory or field-made cable connection may be used to supply power and provide a data-link connection in order aid in tool deployment or maintenance. FIG. 4B illustrates a cross-sectional view of the acoustic waveguide 12. The waveguide 12 includes a waveguide body 40 and a waveguide element 41 that is configured to contact the borehole fluid in the annulus and to guide an acoustic wave along a path defined by the waveguide element 41. The borehole fluid contacting the element 41 interacts with a shear-wave acoustic signal allowing for acoustic measurements of the borehole fluid. A lateral waveguide acoustic leakage barrier 42 may be used to couple the element 41 to the waveguide body 40. The leakage barrier 42, which may be an elastomer, is configured to acoustically isolate the element 41 from the body 40 in order to prevent acoustic leakage from the element 41. A cavity between the body 40 and the element 41 may be filled with oil or a viscoelastic material to provide pressure compensation that can allow the waveguide sensor to operate in the high pressures experienced deep in the borehole. An optional screen may be used to cover the element 41 in order to filter out solids that may interfere with acoustic measurements of the borehole fluid.

Figure 5:
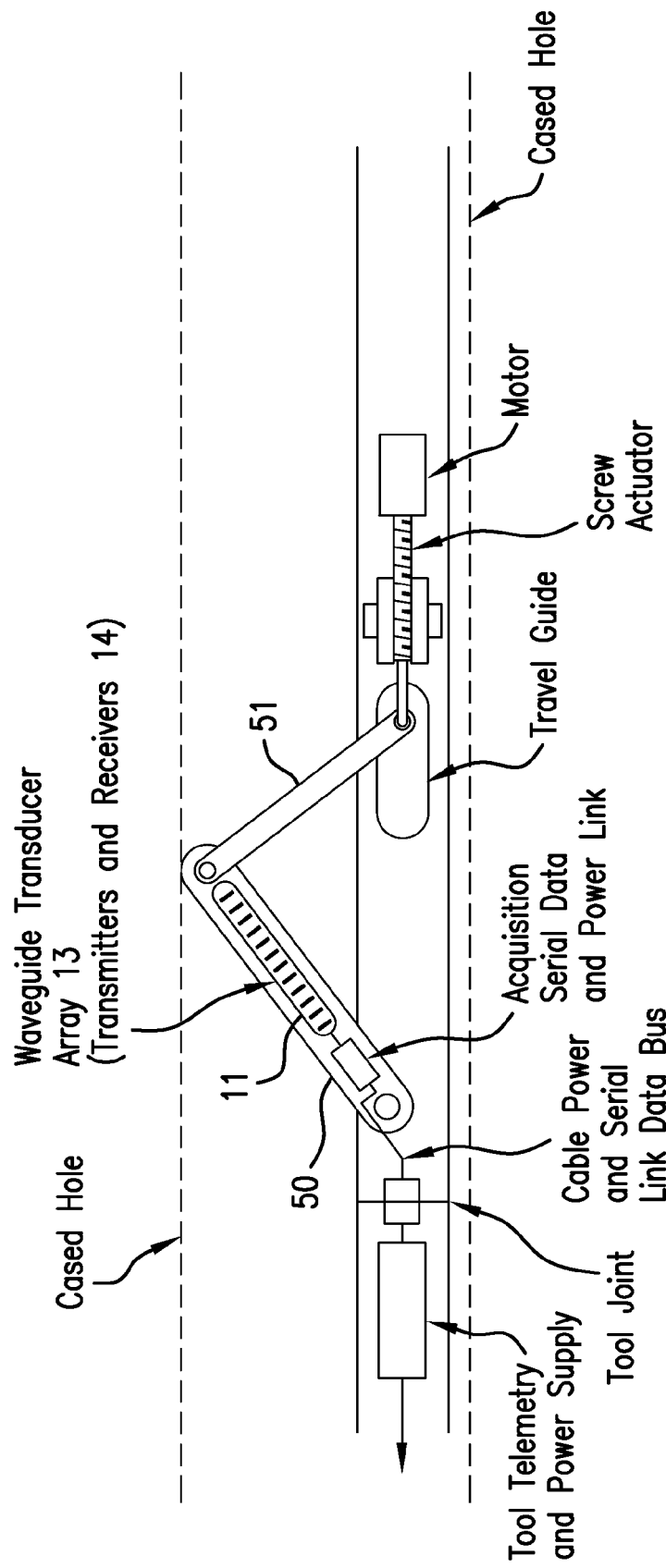
FIG. 5 depicts aspects of an acoustic waveguide sensor disposed on an arm extending from the acoustic downhole tool.

FIG. 5 depicts aspects of another embodiment of the acoustic tool 10. In this embodiment, the array 13 of acoustic transducers 14 is disposed on a rigid articulating arm 50 that is rotationally coupled to a support arm 51. A screw-motor combination, similar to the FIG. 4 embodiment, is configured to apply a longitudinal force to the support arm forcing the support arm to move in a travel guide and thus move the articulating arm into the borehole annulus. This embodiment provides the same or similar advantages as the embodiment of FIG. 4.

Figure 6A:
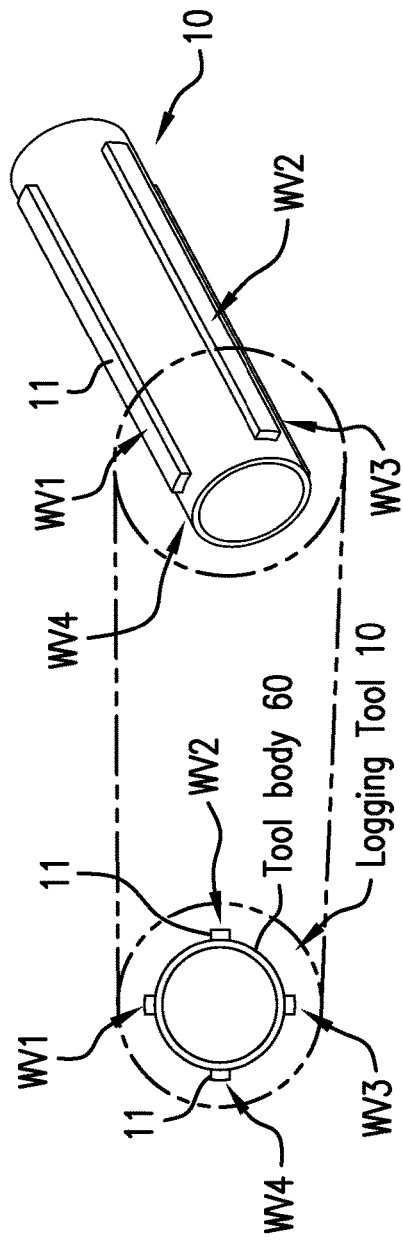
FIGS. 6A and 6B, collectively referred to as FIG. 6, depict aspects of the waveguide sensor being disposed on a body of the acoustic tool.
Figure 6B:
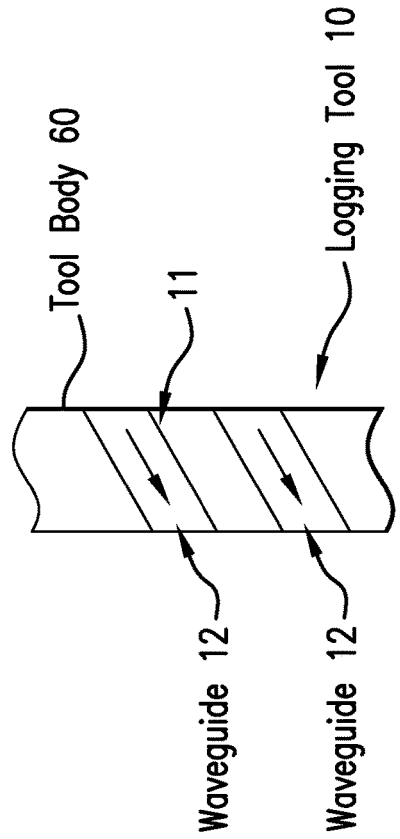

FIG. 6 depicts aspects of the acoustic waveguide sensor being disposed on the tool body 60 of the acoustic tool 10. In the embodiment of FIG. 6A, four acoustic waveguide sensors 11 (referred to as WV1-WV4) are symmetrically disposed in four quadrants on the tool body 60. A longitudinal axis of each of these waveguide sensors 11 is parallel to the longitudinal axis of the tool 10. In the embodiment of FIG. 6B, one waveguide sensor is wrapped around the tool body 60 along a helicoidal path. An advantage of the embodiment of FIG. 6A is that the fluid in four quadrants of the borehole may be analyzed, while the advantage of the embodiment of FIG. 6B is that the borehole fluid for the full 360° circumference may be analyzed.

Figure 7:
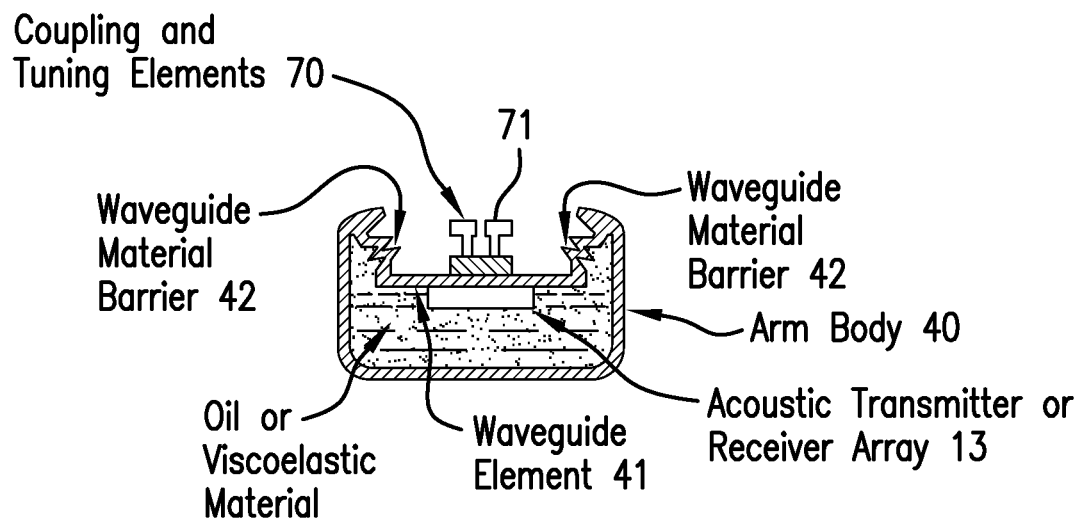
FIG. 7 depicts aspects of the acoustic waveguide sensor having a plurality of tuned resonating elements.

In one or more embodiments, a plurality of mechanical resonators 70 may be disposed on the waveguide element 41 as illustrated in a cross-sectional view in FIG. 7. In general, each mechanical resonator 70 has a unique resonant frequency although in some embodiments some of the mechanical resonators may have the same resonant frequency. In one or more embodiments, the mechanical resonator may be a tuning fork 71 or may have some other mechanically resonating configuration. As an acoustic wave or signal travels down the waveguide element 41, energy from the acoustic wave is dissipated by the borehole fluid in contact with the waveguide element 41. If one of the mechanical resonators resonates, then more energy will be dissipated to the borehole fluid via that mechanical resonator than if there was no mechanical resonator present. The increase in acoustic wave energy loss will represented by a decrease in the amplitude of the measured acoustic signal. Hence, a significant decrease in acoustic wave amplitude measured between two adjacent receiver transducers will indicate which mechanical resonator is resonating. The term "significant decrease" relates to a decrease that is greater than a normal decrease in amplitude when there are no mechanical resonators resonating. Once the resonant frequency is identified, then that resonant frequency can be matched to a reference resonant frequency of a known fluid or fluid component having a known property. In this manner, the fluid of interest can be identified as having the same property as the known fluid or fluid component having the matched reference resonant frequency. An exemplary embodiment of the property is acoustic impedance.

Figure 8:
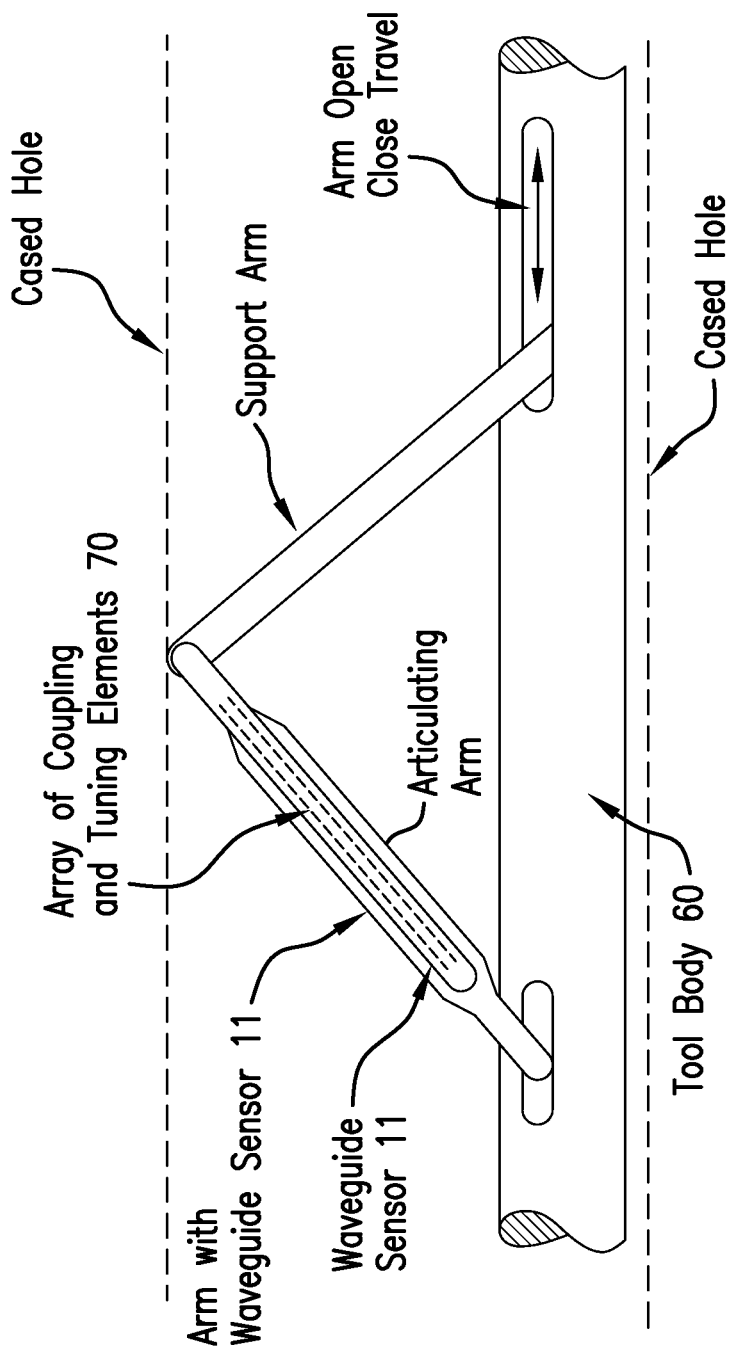
FIG. 8 depicts aspects of the acoustic waveguide sensor having a plurality of tuned resonating elements being disposed on a rigid articulating arm.

FIG. 8 depicts aspects of the acoustic waveguide sensor 11 having the plurality of mechanical resonators 70 where the acoustic waveguide sensor 11 is disposed on the rigid articulating arm 50.

It can be appreciated that the downhole acoustic tool 10 may be calibrated by analysis or by testing in a laboratory or in the field. The testing may include disposing the tool in a borehole or simulated borehole of known geometry filled with a known borehole fluid or fluid component of interest having known properties and performing acoustic measurements on the fluid of interest. Testing may also be used to generate reference measurements of expected known fluids or fluid components having known properties. The reference measurements may then be compared to the acoustic measurements obtained using the tool 10 in order to determine a property of the fluid of interest when the tool measurements are within a certain range of the reference measurements.

Figure 9:
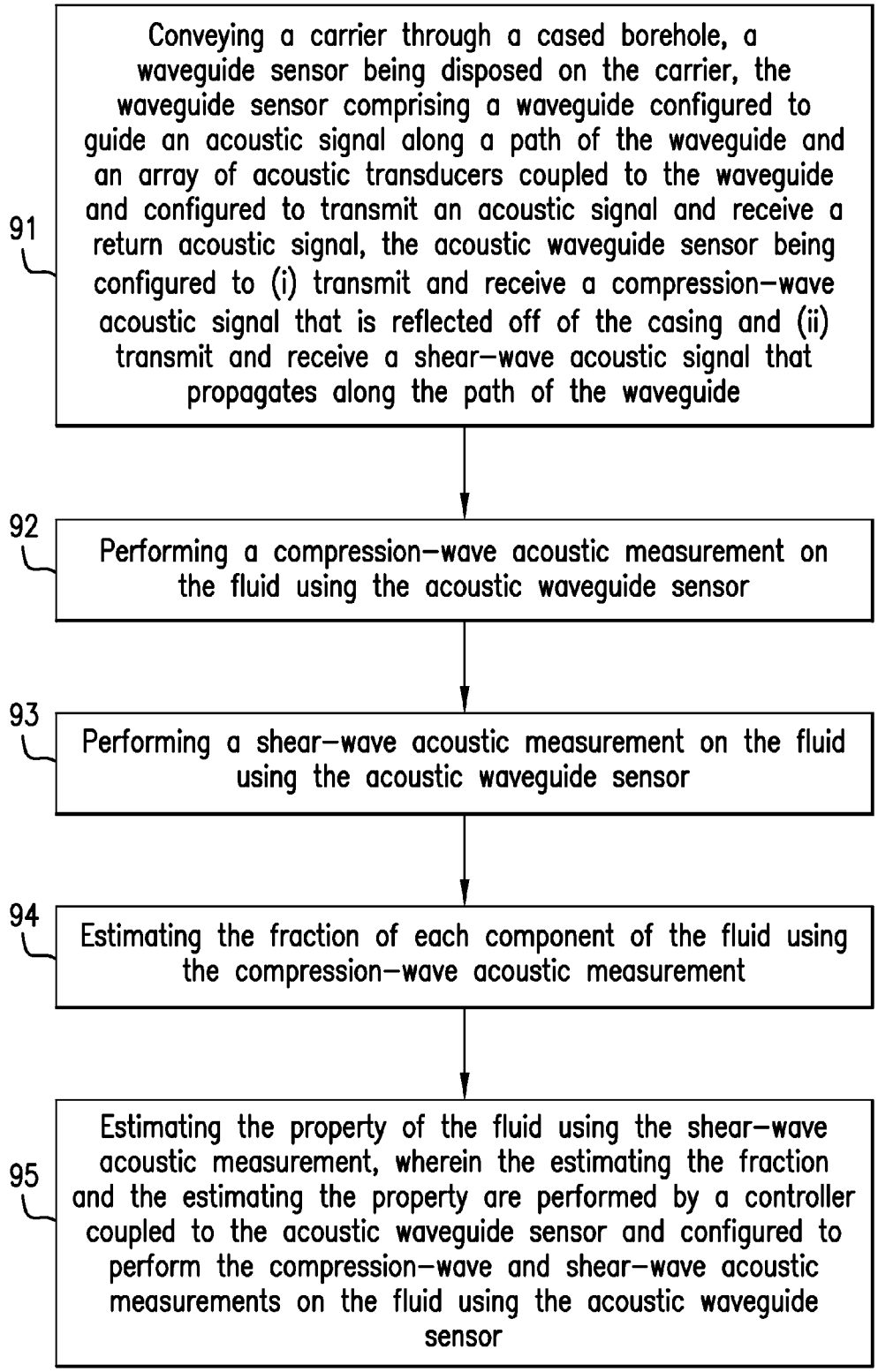
FIG. 9 is a flow chart for a method for estimating a fraction of each component of a fluid flowing in a cased borehole.

FIG. 9 is a flow chart for a method 90 for estimating a fraction of each component of a fluid flowing in a cased borehole. Block 91 calls for conveying a carrier through the cased borehole, a waveguide sensor being disposed on the carrier, the waveguide sensor having a waveguide configured to guide an acoustic signal along a path of the waveguide and an array of acoustic transducers coupled to the waveguide and configured to transmit an acoustic signal and receive a return acoustic signal, the acoustic waveguide sensor being configured to (i) transmit and receive a compression-wave acoustic signal that is reflected off of the casing and (ii) transmit and receive a shear-wave acoustic signal that propagates along the path of the waveguide. Block 92 calls for performing a compression-wave acoustic measurement on the fluid using the acoustic waveguide sensor. Block 93 calls for performing a shear-wave acoustic measurement on the fluid using the acoustic waveguide sensor. Block 94 calls for estimating the fraction of each component of the fluid using the compression-wave acoustic measurement. This block may include comparing the time-of-flight measurement to a time-of-flight calibration reference for each fluid component and identifying a specific component of the fluid when the time-of-flight measurement is within a selected range of the time-of flight calibration reference for that specific component. This block may also include identifying a detection rate for each fluid component and solving an equation that relates each of the detection rates to the fraction of each component in the fluid. Block 95 calls for estimating the property of the fluid using the shear-wave acoustic measurement, wherein the estimating the fraction and the estimating the property are performed by a controller coupled to the acoustic waveguide sensor and configured to perform the compression-wave and shear-wave acoustic measurements on the fluid using the acoustic waveguide sensor. This block may include performing a time-of-flight measurement on the shear acoustic wave between at least two of the acoustic transducers in the array in order to estimate an acoustic velocity of the fluid. This block may also include performing a change in amplitude (e.g., decrease in amplitude) measurement of the shear-wave acoustic signal between at least two acoustic transducers in the array in order measure an acoustic impedance of the fluid.

The method 90 may also include the controller estimating a flow rate of each fluid component. Estimating the flow rate may include: identifying a pattern of time-of-flight measurements for each fluid component over a time period at a first subset of receiver transducers in the array, the time-of-flight measurements including a time-of-flight of an acoustic signal that reflects off of the casing; identifying the pattern for each fluid component at a second subset of receiver transducers in the array downstream from the first subset of receiver transducers; measuring a travel time between when the pattern for each component was identified at the first subset of receiver transducers and when the pattern for each component was identified at the second subset of receiver transducers; and calculating the flow rate by dividing a distance between the first subset of receiver transducers and the second subset of receiver transducers by the travel time. It can be appreciated that more than two subsets of transducers may be used to track an identification pattern for each fluid component as each fluid component flows downstream. It can also be appreciated that each subset of transducers may include one or more transmitter transducers. Increasing the number of subsets or increasing the number of transducers in a subset or array can increase the number or acoustic measurements and thus may also increase the signal to noise ratio of the results of the acoustic measurements.

When the waveguide sensor includes one or more mechanical resonators disposed on the waveguide between receiver transducers with each mechanical resonator being configured to resonate at a known unique frequency, the method 90 implemented by the controller may include determining at which receiver transducer a largest amplitude decrease occurs and associating the amplitude decrease to the known unique frequency of the corresponding mechanical resonator; matching the known unique frequency of the corresponding mechanical resonator to a reference resonant frequency of a known fluid having a known property; and identifying a property of the fluid of interest using the property of the known fluid.

The method 90 may also include providing an output signal having one or more of the estimated values via an output interface in the controller to an output signal receiver device. Non-limiting embodiments of the output receiver device include a display, a printer, memory, and a storage medium such as a non-transitory computer-readable medium. It can be appreciated that the one or more estimated values may be stored in the memory or the storage medium thus transforming the memory or storage medium from a prior state (not containing the result) to a new state (containing the result). Further, the output signal receiving device may be a processing system configured to perform calculations such as well-performance calculations requiring values estimated by the controller. The output signal receiver device may be configured to present an alert signal to a user when any of the estimated properties exceeds a threshold value.

The above disclosed apparatus and method provide several advantages. One advantage is that the fraction or percentage of each fluid component in the borehole fluid of interest may be determined quickly thus decreasing the amount of time the borehole is used for logging and increasing the time the borehole may be used for other purposes such as production. Similarly, other types of acoustic measurements may also be performed quickly including acoustic velocity measurements, which may then be used in the acoustic measurements for determining the fluid component fractions and fluid component flow rates.

In support of the teachings herein, various analysis components may be used, including a digital and/or an analog system. For example, the downhole electronics 8 or the computer processing system 9 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or any combination of terms. The term "configured" relates one or more structural limitations of a device that are required for the device to perform the function or operation for which the device is configured. The term "coupled" relates to a first component being coupled either directly to a second component or indirectly through an intermediate component. The terms "first" and "second" do not denote a particular order, but are used to distinguish different elements.

The flow diagrams depicted herein are just examples. There may be many variations to this diagram or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a fraction of each component of a fluid of interest flowing in a cased borehole and a property of the fluid, the apparatus comprising:
a carrier configured to be conveyed through the cased borehole;
an acoustic waveguide sensor disposed on the carrier, the acoustic waveguide sensor comprising a waveguide configured to guide an acoustic signal along a path of the waveguide and an array of acoustic transducers coupled to the waveguide and configured to transmit an acoustic signal and receive a return acoustic signal, the acoustic waveguide sensor being configured to (i) transmit and receive a compression-wave acoustic signal that is reflected off of the casing and (ii) transmit and receive a shear-wave acoustic signal that propagates along the path of the waveguide; and
a controller coupled to the acoustic waveguide sensor and configured to perform a compression-wave acoustic measurement on the fluid using the acoustic waveguide sensor in order to estimate the fraction of each component of the fluid and to perform a shear-wave acoustic measurement in order to estimate the property of the fluid.

2. The apparatus according to claim 1, wherein components of the fluid comprise oil, gas and water.

3. The apparatus according to claim 1, wherein the acoustic measurement is a time-of-flight measurement of the compression-wave acoustic signal transmitted by the acoustic waveguide sensor that reflects off of the casing and is received by the acoustic waveguide sensor.

4. The apparatus according to claim 3, wherein the controller is further configured to compare the time-of-flight measurement to a time-of-flight calibration reference for each fluid component.

5. The apparatus according to claim 4, wherein the controller is further configured to identify a specific component of the fluid when the time-of-flight measurement is within a selected range of the time-of flight calibration reference for that specific component.

6. The apparatus according to claim 5, wherein the controller is further configured to identify a detection rate for each component and to solve an equation that relates each of the detection rates to the percentage of each component in the fluid.

7. The apparatus according to claim 1, wherein the controller is further configured to estimate a flow rate of each component.

8. The apparatus according to claim 7, wherein the controller is further configured to identify a pattern of time-of-flight measurements for each component over a time period at a first subset of receiver transducers in the array, the time-of-flight measurements comprising a time-of-flight of an acoustic signal that reflects off of the casing.

9. The apparatus according to claim 8, wherein the controller is further configured to identify the pattern for each component at a second subset of receiver transducers in the array downstream from the first subset of receiver transducers.

10. The apparatus according to claim 9, wherein the controller is further configured to measure a travel time between when the pattern for each component was identified at the first subset of receiver transducers and when the pattern for each component was identified at the second subset of receiver transducers.

11. The apparatus according to claim 10, wherein the controller is further configured to calculate the flow rate by dividing a distance between the first subset of receiver transducers and the second subset of receiver transducers by the travel time.

12. The apparatus according to claim 1, further comprising an arm configured to extend from the carrier into an annulus of the borehole, the waveguide sensor being disposed on the arm such that the waveguide sensor extends into the annulus with the arm.

13. The apparatus according to claim 1, wherein the acoustic waveguide is flexible or comprises an array of waveguides with each waveguide sensor being flexibly coupled to an adjacent waveguide such that a vector component of force applied to an end waveguide in a longitudinal direction of the carrier causes the flexible waveguide or series of waveguides to form an arc extending into an annulus of the borehole.

14. The apparatus according to claim 1, further comprising one or more mechanical resonators disposed on the waveguide between receiver transducers, each mechanical resonator being configured to resonate at a known unique frequency.

15. The apparatus according to claim 14, wherein the controller is further configured to:
determine at which receiver transducer a largest amplitude decrease occurs and associate the amplitude decrease to the known frequency of the corresponding mechanical resonator;
match the known unique frequency of the corresponding mechanical resonator to a reference resonant frequency of a known fluid having a known property; and
identify a property of the fluid of interest using the property of the known fluid.

16. The apparatus according to claim 14, wherein the mechanical resonator is a tuning fork.

17. The apparatus according to claim 1, wherein the property is at least one of acoustic velocity and acoustic impedance.

18. The apparatus according to claim 1, wherein the controller is further configured to measure a time of flight of the shear-wave acoustic signal between at least two acoustic transducers in the array in order to measure an acoustic velocity of the fluid.

19. The apparatus according to claim 1, wherein the controller is further configured to measure a change in amplitude of the shear-wave acoustic signal between at least two acoustic transducers in the array in order measure an acoustic impedance of the fluid.

20. A method for estimating a fraction of each component of a fluid flowing in a cased borehole and a property of the fluid, the method comprising:
conveying a carrier through the cased borehole, a waveguide sensor being disposed on the carrier, the waveguide sensor comprising a waveguide configured to guide an acoustic signal along a path of the waveguide and an array of acoustic transducers coupled to the waveguide and configured to transmit an acoustic signal and receive a return acoustic signal, the acoustic waveguide sensor being configured to (i) transmit and receive a compression-wave acoustic signal that is reflected off of the casing and (ii) transmit and receive a shear-wave acoustic signal that propagates along the path of the waveguide;

performing a compression-wave acoustic measurement on the fluid using the acoustic waveguide sensor;

performing a shear-wave acoustic measurement on the fluid using the acoustic waveguide sensor;

estimating the fraction of each component of the fluid using the compression-wave acoustic measurement; and estimating the property of the fluid using the shear-wave acoustic measurement;

wherein the estimating the fraction and the estimating the property are performed by a controller coupled to the acoustic waveguide sensor and configured to perform the compression-wave and shear-wave acoustic measurements on the fluid using the acoustic waveguide sensor.

21. The method according to claim 20, wherein performing a compression-wave acoustic measurement comprises transmitting a compression-wave acoustic signal that reflects off of the casing and measuring time-of-flight of the compression-wave acoustic signal received by the acoustic waveguide sensor.

22. The method according to claim 21, wherein estimating the fraction comprises comparing the time-of-flight measurement to a time-of-flight calibration reference for each fluid component and identifying a specific component of the fluid when the time-of-flight measurement is within a selected range of the time-of flight calibration reference for that specific component.

23. The method according to claim 21, wherein estimating the fraction further comprises identifying a detection rate for each component and solving an equation that relates each of the detection rates to the fraction of each component in the fluid.

24. The method according to claim 20, wherein performing a shear-wave acoustic measurement on the fluid comprises performing a time-of-flight measurement on the shear acoustic wave between at least two of the acoustic transducers in the array in order to estimate an acoustic velocity of the fluid.

25. The method according to claim 20, wherein performing a shear-wave acoustic measurement on the fluid comprises performing a change in amplitude measurement of the shear-wave acoustic signal between at least two acoustic transducers in the array in order measure an acoustic impedance of the fluid.

* * * * *